(12) United States Patent
Dupuy (10) Patent No.: US 12,121,011 B2
(45) Date of Patent: Oct. 22, 2024

(54) INTERNAL LINE TELESCOPIC FISHING ROD

(71) Applicant: CTFI, Bidart (FR)

(72) Inventor: Jean-François Dupuy, Saint Jean de Luz (FR)

(73) Assignee: CTFI, Bidart (FR)

( * ) Notice: Subject to any disclaimer, the term of this patent is extended or adjusted under 35 U.S.C. 154(b) by 506 days.

(21) Appl. No.: 17/414,226

(22) PCT Filed: Dec. 17, 2019

(86) PCT No.: PCT/FR2019/053124
§ 371 (c)(1),
(2) Date: Jun. 15, 2021

(87) PCT Pub. No.: WO2020/128306
PCT Pub. Date: Jun. 25, 2020

(65) Prior Publication Data
US 2022/0039364 A1 Feb. 10, 2022

(30) Foreign Application Priority Data
Dec. 18, 2018 (FR) ........................................ 1873231

(51) Int. Cl.
*A01K 87/00* (2006.01)
*A01K 87/02* (2006.01)

(52) U.S. Cl.
CPC .......... *A01K 87/005* (2013.01); *A01K 87/025* (2013.01)

(58) Field of Classification Search
CPC .... A01K 87/00; A01K 87/002; A01K 87/005; A01K 87/02; A01K 87/025

(Continued)

(56) References Cited

U.S. PATENT DOCUMENTS

| 359,153 | A | * | 3/1887 | Horton | ................... | A01K 87/00 |
| | | | | | | 43/18.1 R |
| 734,870 | A | * | 7/1903 | Hoglund | ............... | A01K 89/015 |
| | | | | | | 231/3 |

(Continued)

FOREIGN PATENT DOCUMENTS

| CN | 1471815 A | * | 2/2004 | ............. | A01K 87/00 |
| CN | 1498530 A | * | 5/2004 | ............. | A01K 87/02 |

(Continued)

OTHER PUBLICATIONS

International Search Report for PCT/FR2019/053124 dated May 8, 2020, 7 pages.

(Continued)

*Primary Examiner* — Darren W Ark
(74) *Attorney, Agent, or Firm* — NIXON & VANDERHYE (57) ABSTRACT

A fishing rod includes at least three telescopic sections: a first section, N0, a last tip section, and an intermediate section. The first section defines a line input passage on the periphery thereof. The rod goes from fully retracted to deployed positions, and a semi-retracted position, called the line input position, in which section N0+i, i≥1, is deployed with respect to section N0 and in which the tip is received into such section. A first retainer abuts, in the semi-retracted position, against the tip to retain the tip with respect to section and prevent it from reaching the line input passage. A second retainer holds the tip in the semi-retracted position when subjected to forces of less than 10 N tending to move it away from section N0, in a location at less than 30 centimetres, from a position of abutment against the first retainer.

13 Claims, 7 Drawing Sheets

(58) Field of Classification Search
USPC .................. 43/18.1 R, 18.1 CT, 18.1 HR
See application file for complete search history.

(56) References Cited

U.S. PATENT DOCUMENTS

| | | | | | |
|---|---|---|---|---|---|
| 1,276,780 | A | * | 8/1918 | Lucas | A01K 87/00 |
| | | | | | 43/18.1 R |
| 1,643,003 | A | * | 9/1927 | Chromczak | A01K 87/025 |
| | | | | | 43/18.1 CT |
| 2,276,524 | A | * | 3/1942 | Taylor | A01K 87/025 |
| | | | | | 43/18.1 R |
| 2,541,609 | A | * | 2/1951 | Pullan | A01K 87/005 |
| | | | | | 43/18.1 R |
| 2,578,663 | A | * | 12/1951 | Beaupre | A01K 87/025 |
| | | | | | 43/18.1 R |
| 2,787,484 | A | * | 4/1957 | Macy | A01K 87/025 |
| | | | | | 43/18.5 |
| 2,874,507 | A | * | 2/1959 | Faber | A01K 87/025 |
| | | | | | 43/18.1 CT |
| 3,417,500 | A | * | 12/1968 | Carabasse | A01K 91/12 |
| | | | | | 403/109.5 |
| 3,432,958 | A | * | 3/1969 | Bellinger | A01K 97/08 |
| | | | | | 43/25 |
| 3,618,253 | A | * | 11/1971 | Edwards et al. | A01K 87/025 |
| | | | | | 403/109.8 |
| 3,727,338 | A | * | 4/1973 | Pedersen | A01K 87/002 |
| | | | | | 403/109.5 |
| 3,789,533 | A | * | 2/1974 | Bowerfind | A01K 87/002 |
| | | | | | 43/18.1 HR |
| 3,862,509 | A | * | 1/1975 | Petersen, Jr. | A01K 87/005 |
| | | | | | 43/18.1 R |
| 4,237,639 | A | * | 12/1980 | Uemori | A01K 87/025 |
| | | | | | 43/18.1 CT |
| 4,541,197 | A | * | 9/1985 | LeRoue | A01K 87/025 |
| | | | | | 43/18.1 R |
| 5,829,182 | A | * | 11/1998 | Okamoto | A01K 87/005 |
| | | | | | 43/24 |
| 6,243,981 | B1 | * | 6/2001 | Komura | A01K 87/005 |
| | | | | | 43/18.1 R |
| 7,461,476 | B1 | * | 12/2008 | Davis | A01K 87/002 |
| | | | | | 43/18.1 R |
| 2016/0198688 | A1 | * | 7/2016 | Duda | A01K 87/06 |
| | | | | | 43/20 |

FOREIGN PATENT DOCUMENTS

| | | | | |
|---|---|---|---|---|
| CN | 113951219 | A | * | 1/2022 |
| DE | 3831821 | A1 | * | 3/1989 |
| EP | 0 102 873 | | | 3/1984 |
| EP | 0632956 | A1 | * | 1/1995 |
| EP | 0 711 499 | | | 5/1996 |
| EP | 0711499 | A1 | * | 5/1996 |
| EP | 0761093 | A2 | * | 3/1997 |
| EP | 0832559 | A3 | * | 4/1999 |
| FR | 2531610 | A1 | * | 2/1984 |
| FR | 2 539 582 | | | 7/1984 |
| FR | 2539582 | A1 | * | 7/1984 |
| FR | 2563694 | A1 | * | 11/1985 |
| FR | 2 666 721 | | | 3/1992 |
| FR | 2666721 | A1 | * | 3/1992 |
| FR | 2681507 | A1 | * | 3/1993 | ........... A01K 87/005 |
| FR | 2696900 | A1 | * | 4/1994 | ........... A01K 87/005 |
| GB | 2302786 | A | * | 2/1997 | ............ A01K 87/00 |
| GB | 2350271 | A | * | 11/2000 | ........... A01K 87/002 |
| JP | 2006288288 | A | * | 10/2006 |
| JP | 2015500632 | A | * | 1/2015 |
| JP | 2015112108 | A | * | 6/2015 | ........... A01K 87/005 |
| JP | 6429571 | B2 | * | 11/2018 |
| JP | 6568014 | B2 | * | 8/2019 |
| KR | 200335915 | Y1 | * | 12/2003 |
| KR | 20040040351 | A | * | 5/2004 |
| KR | 20080020874 | A | * | 3/2008 |
| KR | 20120136539 | A | * | 12/2012 |
| WO | WO-2016115226 | A1 | * | 7/2016 | ........... A01K 87/005 |

OTHER PUBLICATIONS

Written Opinion of the ISA for PCT/FR2019/053124 dated May 8, 2020, 6 pages.

* cited by examiner

INTERNAL LINE TELESCOPIC FISHING ROD

CROSS-REFERENCE TO RELATED APPLICATIONS

This application is the U.S. national phase of International Application No. PCT/FR2019/053124 filed Dec. 17, 2019 which designated the U.S. and claims priority to FR 1873231 filed Dec. 18, 2018, the entire contents of each of which are hereby incorporated by reference.

BACKGROUND OF THE INVENTION

Field of the Invention

The invention relates to the field of fishing, particularly with a telescopic fishing rod with an internal line.

Description of the Related Art

Traditionally, telescopic fishing rods are provided with external rings in order to receive and guide the line.

Patent FR2666721 describes a telescopic fishing rod with truncated-cone sections that fit within each other, and movable line guide elements of increasing diameter that fit inside some of the sections. These movable line guide elements cooperate with each other when the sections are retracted into each other, so that when a user deploys the fishing rod, the movable line guide elements are moved and are wedged together one after the other in the sections.

In the present application, it is understood that "section diameter" will sometimes be used loosely to refer to a range of dimensions of the (circular or non-circular) cross-section of the section. For example, a section A may be said to have a larger diameter compared to a section B if the cross-sections of section A and the cross-sections of section B have dimensions within value ranges such that section A can receive section B over at least 30% of the length thereof, and advantageously over more than 70% of the length thereof.

In terms of user comfort and compactness of the device, it is advantageous to proceed with a lateral line insertion through an opening lying in a direction having a radial component, while allowing the section defining said opening to receive the other sections. Document EP 0 711 499 describes such a rod.

However, there is a need for a telescopic fishing rod with an internal line, lateral line insertion, and sections that can be retracted into the section defining the line input passage, that would allow for easier line insertion.

SUMMARY OF THE INVENTION

A fishing rod is provided comprising an assembly of at least three sections (advantageously truncated cones) that can fit within each other, said assembly comprising a first section, called section N0, a last section, called a tip, and a subset of intermediate section(s) between the first section and the tip, said subset comprising at least one intermediate section, the intermediate section with the largest diameter among said at least one intermediate section of said subset, called (N0+1), being capable of fitting within section N0, and the intermediate section with the smallest diameter among said at least one intermediate section of said subset being capable of receiving the tip.

Advantageously and in a non-limiting way, the first section can define along its periphery a line input passage lying in a direction having a radial component.

Advantageously and in a non-limiting way, this rod is arranged to be able to go from a fully retracted position, in which all the sections of said assembly fit within each other, to a deployed position in which all the sections of said assembly are deployed with respect to each other, and furthermore to be able to adopt a semi-retracted position, called the line input position, in which section (N0+i), where i is equal to or greater than 1, is deployed with respect to section N0 and in which the tip is inside section (N0+i).

In the semi-retracted position, sections N0, . . . , N0+i are deployed with respect to each other and sections N0+i+1, . . . , up to the tip are retracted into section N0+i.

There may be one or more sections between section N0 and section (N0+i), that is, i=2, 3, or more.

Alternatively, i=1, that is, section (N0+1) receives all the other sections of smaller diameter in the semi-retracted position.

Advantageously and in a non-limiting way, the rod may further comprise
  first retention means so as to abut, in the semi-retracted position when the tip is pushed toward section N0, for example with a force of less than 10 N, against the tip in such a way as to retain the tip with respect to section (N0+i) and prevent it from reaching the line input passage, and
  second retention means to retain the tip in the semi-retracted position, when subjected to forces of less than 10 N tending to move it away from section N0, to a location corresponding to an abutment against the first retention means or to less than 30 centimetres, advantageously to less than 20 hundredths, advantageously to less than 10 centimetres (or alternatively to less than 30%, advantageously less than 20%, advantageously less than 10%, of the length of section N0+1) from a position of abutment against the first retention means.

This is understood to mean that:
  the first retention means may be arranged so that, for example, in the semi-retracted position, they abut against the tip so as to retain the tip in relation to section (N0+i) and prevent it from reaching the line input passage, as long as the tip is subjected to forces of less than 10 N tending to push it toward section N0; in particular, this retention may take place when this force is less than a limit value; this first limit value can be 10 N or more, for example 15 N or 20 N; the tip can be designed to reach the line input passage at a force greater than this limit value; and that
  second retention means are arranged to retain the tip in the semi-retracted position—at a location corresponding to an abutment against the first retention means or at less than 30 centimetres, advantageously less than 20 hundredths, advantageously less than 10 centimetres (or alternatively less than 30%, advantageously less than 20%, advantageously less than 10%, of the length of section N0+1) from a position of abutment against the first retention means)—as long as the tip is subjected to a force of less than 10 N tending to move it away from section N0. In particular, this retention may take place when this force is less than a second limit value and the tip may no longer be retained when this force exceeds this second limit value. This second limit value can be 10 N or more, for example 15 N, 20 N, or 30 N.

The invention is not limited to a particular embodiment of the first retention means.

For example, the first retention means may comprise:
- a line guide element attached to the larger-diameter end of section (N0+i), said element defining an opening for the line, said opening being delimited by edges extending enough to abut against the tip or an element attached to the tip when the tip is pushed toward section N0;
- a ridge at the narrower end of the tip which abuts against the end of at least one other section when the tip is subjected to forces tending to bring it closer to section N0, and retains the suspended tip, as in document EP 0 711 499; and/or
- other.

The second retention means prevent or limit the opposite movements, particularly when the rod is placed vertically with its narrower-diameter end lower than its larger-diameter end.

The possible movements of the tip in the semi-retracted position can thus be limited to a range of, for example, 30, 20, or 10 cm, so that the rod can be designed in such a way that, when in the semi-retracted position, the line is better guided toward the larger-diameter inlet of the tip. Line insertion can thus be greatly facilitated.

Advantageously and in a non-limiting way, the fishing rod may further comprise:
- for at least one intermediate section, said at least one section being frustoconical, a set of at least one movable line guide element in said intermediate section, each element of said set having an outside diameter within the range of inside diameters of said intermediate section and defining a line opening.

Naturally, the invention is not limited to a particular type of opening. Cylindrical holes may be provided, with, for example, a circular or square base, or holes with a variable cross-section, for instance in order to guide the line.

In one embodiment, each intermediate section of the subset of intermediate section(s) receives a set of at least one movable line guide element.

In another embodiment, at least one intermediate section of the subset of intermediate sections is free of movable line guide elements.

For example, the intermediate section immediately preceding the tip may be free of movable line guide elements, particularly in the case of a fishing rod intended for ocean fishing. This section without movable line guide elements can, for example, be shorter than the other sections. In this way the rod can be made more robust.

For example, section (N0+1) can be free of any movable line guide elements.

In another embodiment, the rod can be free of movable line guide elements. In this case, for example, an adequate plug may be provided, and/or the larger-diameter ends of the sections (or elements attached to the ends of the sections) may be designed to fit within each other in the semi-retracted state, thus retaining the tip in both directions.

In one embodiment, the first section can be preceded by one or more other sections.

For example, a spool of line can be installed on a section preceding section N0.

Advantageously, the rod can be arranged so that the position of this one or these several other sections can be adjusted in relation to section N0.

Advantageously, elastic annular joints can be provided between section N0 and the section immediately preceding, and, if applicable, between sections preceding section N0, thus allowing the position of this section or these sections preceding section N0 to be adjusted.

Alternatively, the larger-diameter end of the first section corresponds to one end of the fishing rod.

Advantageously and in a non-limiting way, the first retention means may be arranged so that, in the semi-retracted position, they further retain said at least one set of at least on movable line guide element so as to prevent it from reaching the line input passage when the tip is pushed toward section N0.

Consequently, in the semi-retracted position, when the tip is pushed toward the first section, rod elements abut against each other thus preventing the section(s) of smaller cross-section than those of section (N0+i) from passing through this section (N0+i) and entering section N0.

Advantageously and in a non-limiting way, the rod can be arranged so that, in the semi-retracted position, for example when the tip is subjected to forces of less than 10 N tending to move it away from the first section, at least one (and preferably each) movable line guide element is less than 5 cm from another movable line guide element or a section inlet, advantageously less than 2 cm, advantageously less than 1 cm. The lengths of the sections and of the movable line guide elements can be modified.

Advantageously and in a non-limiting way, the rod can be arranged so that, in the semi-retracted position, for example when the tip is subjected to forces of less than 10 N tending to move it away from the first section, for at least one intermediate section receiving a set of one or more movable line guide elements, at least one (and preferably each) movable line guide element of said set is attached to another larger-diameter movable line guide element or to a section inlet. In this way, the set of one or more movable line guide elements received into this intermediate section is against the next section. The passing of the line is then particularly easy, since the inlets defined in these movable guide elements and of the section inlets line up with each other, forming a short tunnel.

Advantageously and in a non-limiting way, the rod can be arranged so that, in the semi-retracted position, for example when the tip is subjected to forces of less than 10 N tending to move it away from the first section, for at least one intermediate section, the smaller-diameter movable line guide element received into this intermediate section is attached (removably or non-removably) to the next section.

For example, a frustoconical intermediate section may receive a single movable line guide element. This element can advantageously be attached, for example by removable means, to the next section when the rod is in the semi-retracted state, and advantageously to the intermediate section itself as well, for example by means of an inlet element attached to the larger-diameter inlet of the intermediate section. When the rod is deployed, the attachment to this input element is undone and the movable element is drawn by the next section to a wedged position against the inside walls of the section, this wedging breaking the attachment to the next section.

Advantageously and in a non-limiting way, for at least one intermediate section, the set of movable line guide elements received into said intermediate section may comprise at least two movable line guide elements.

Advantageously and in a non-limiting way, in this case the rod can be arranged so that, in the semi-retracted position, for example when the tip is subjected to forces of less than 10 N tending to move it away from the first section, for at least one intermediate section, all the movable line guide elements received into said intermediate section are removably attached to each other.

Consequently, when collapsing from the deployed position, a section (N1+1) sees the movable line guide elements received into section N1 become attached to its end one after the other. The insertion of the line from the movable line guide element of larger diameter among those received into section N1 toward section (N1+1) is then relatively easy, the passages of the guide elements forming a tunnel.

Advantageously, the rod can be arranged so that these removable attachments resist a force of less than 10 N.

Advantageously and in a non-limiting way, the rod can be arranged so that, in the semi-retracted position, for example with the tip being subjected to forces of less than 10 N tending to move it away from the first section, for at least one intermediate section, the movable line guide element of larger diameter among those received into said intermediate section is removably attached to said intermediate section, for example by a fixed line guide element attached (threaded or wedged, for example) to or as an integral part of the larger-diameter inlet of this intermediate section.

If the movable line guide element of smaller diameter among those received into this intermediate section is furthermore attached to the next section, then in the semi-retracted position the intermediate section and the next section are held together by these attachments by means of the line guide elements.

If there are several movable line guide elements in the intermediate section, they can be attached to each other.

The second retention means can thus be integrated into the movable line guide element(s) and into the sections, because these reversible attachments allow the adjacent intermediate sections receiving the movable line guide elements to be held together.

When all the intermediate sections receive one or more movable line elements, these attachments allow all the sections from section (N0+i) to the tip to be held together.

Consequently, in an advantageous way, the second retention means can comprise said at least one set of at least one movable line guide element.

In the case of intermediate sections free of any movable line guide elements, the second retention means can further comprise means of cooperation between each intermediate section free of movable line guide elements and the next one or the tip.

Advantageously and in a non-limiting way, the rod can be arranged, and the tip can be chosen with a length, such that in the semi-retracted position and when subjected to forces of less than 10 N tending to move it away from section N0, the free end thereof forms a protrusion (extending beyond) with respect to the smaller-diameter end(s) of the intermediate section(s), thus facilitating the gripping thereof for transitioning to the deployed position of rod use.

When the intermediate section subset comprises several intermediate sections receiving movable line guide elements, said plurality of sets of line guide elements can form a tunnel going, for example, from the tip (or from an intermediate section preceding the tip and devoid of movable line guide elements) to the larger-diameter inlet of the intermediate section closest to the first section, to the larger-diameter movable line guide element, or other item.

In one embodiment, the second retention means can comprise a plugging device intended for the free end of the tip and arranged to keep the tip and sections up to section (N0+i) together, independently of the first section (that is, the plugging device does not prevent sections (N0+i), . . . , the tip, held together from being moved together in relation to section N0). This plugging device can thus prevent the tip from being deployed with respect to the preceding section and, if applicable, the intermediate sections from being deployed from each other.

This plugging device can comprise, for example, a bottom intended to come in front of the smaller-diameter ends of the tip and the intermediate section(s) involved, and an advantageously flexible peripheral wall intended to come into contact with the inside or outside surface of an end portion of intermediate section (N0+i).

Advantageously, the plugging device may further be arranged to be able to hold the tip, the subset of intermediate section(s), and the first section together when the fishing rod is in the retracted position.

Thus, a same plugging device is used in the retracted position and in the semi-retracted line input position to prevent deployment of the rod.

The invention is not in any way limited to second retention means comprising means of attaching section (N0+i) to the tip by one or more movable line guide elements. For example, in the case of second retention means comprising only a plug, the rod can be arranged so that the larger-diameter movable line guide element is attached directly with the intermediate section into which it is received. Thus, when the plug is removed and the rod is turned over, the next section following this section (N0+i), such as the tip in the case of a three-section rod, comes out, thus facilitating the gripping thereof by the user in order to transition to the deployed position.

A fishing rod is also provided comprising:

an assembly of at least three sections that can fit telescopically within each other, said assembly comprising a first section, called section N0, a last section, called a tip, and a subset of intermediate section(s) between the first section and the tip, said subset comprising at least one intermediate section, the intermediate section with the largest diameter among said at least one intermediate section of said subset, called (N0+1), being capable of fitting within section N0, and the intermediate section with the smallest diameter among said at least one intermediate section of said subset being capable of receiving the tip.

Advantageously and in a non-limiting way, the first section can define along its periphery a line input passage lying in a direction having a radial component, the rod being arranged so that the line comes out through an opening in the tip at the smaller-diameter end of the tip, called the line outlet end.

Advantageously and in a non-limiting way, this rod is arranged to be able to go from a fully retracted position, in which all the sections of said assembly fit within each other, to a deployed position in which all the sections of said assembly are deployed with respect to each other, and furthermore to be able to adopt a semi-retracted position, called the line input position, in which section (N0+i), where i is equal to or greater than 1, is deployed with respect to section N0 and in which the tip is inside section (N0+i).

Advantageously and in a non-limiting way, this rod may further comprise a plugging device for the line outlet end, said plugging device comprising:

first means of attaching sections (N0+i), . . . up to the tip, independently of section N0, said first means of attachment being arranged to prevent the tip and the sections up to section (N0+i) from being deployed with respect to each other, while allowing a movement of section (N0+i) in relation to section N0, and second means of attachment of all the sections in the assembly, said second means being arranged to prevent the sections of the assembly from being deployed in relation to each other.

Thus, this plugging device can keep all the sections from section (N0+i) up to the tip together, particularly when the rod is in the semi-retracted position. In the case of a rod with movable line guide elements, these means of attachment may comprise or be part of the second retention means described earlier, because they prevent the tip from being moved in relation to section N0 when the semi-retracted rod is turned over.

And the same plugging device can be used to keep the rod in the fully retracted position.

Advantageously and in a non-limiting way, the fishing rod may further comprise:

for at least one frustoconical intermediate section, a set of at least one movable line guide element in said intermediate section, each element of said set having an outside diameter within the range of inside diameters of said intermediate section and defining a line opening.

Alternatively, the rod may be devoid of any movable line guide elements.

Advantageously, the movable line guide elements can be attached to other (movable or fixed) line guide elements when transitioning from the deployed position to the semi-retracted position, thus making it possible to participate in tip retention.

When the movable line guide elements form a tunnel, the guiding of the line is, in addition, facilitated.

In one embodiment, the plugging device may comprise:
a bottom (solid or not) sized to cover the openings in sections (N0+i) up to the tip,
a first peripheral wall, advantageously flexible, protruding from the bottom and sized to come into contact with the inside or outside surface of an end portion of section (N0+i), and
a second peripheral wall, advantageously flexible, having a larger diameter than the first peripheral wall and sized to come into contact with the inside or outside surface of an end portion of section N0.

The first and the second wall can be concentric.

The second wall may or may not extend from the bottom. For example, there could be an offset from the first wall.

Advantageously and in a non-limiting way, the first wall can extend from the bottom over a length greater than that of the second wall, which can facilitate transitioning from the fully retracted position to the semi-retracted position.

A fishing rod is also provided comprising:
an assembly of at least two sections that can fit telescopically within each other, said assembly comprising at least a first line inlet section, called section N0, and a last section, called the tip.

Section N0 defines a line input passage in the section assembly, for example an opening with a larger diameter at one end of section N0, or a radial opening defined in section N0, and the rod is arranged so that the line comes out through an opening in the tip at the smaller-diameter end of the tip, called the line outlet end.

The fishing rod further comprises a plugging device arranged to keep the sections in the assembly of at least two sections in the retracted position (and advantageously in the semi-retracted position when the assembly comprises at least three sections).

The plugging device comprises two movable plugging elements that can move rotationally in relation to each other about the longitudinal axis of the rod when the plugging device is installed at the line outlet end, each plugging element defining a through-hole for the line to pass through.

The plugging device is arranged so that the plugging elements can be arranged according to a first configuration, in which said holes overlap at least partially so that the line can be wound up or paid out, and also according to a second configuration in which the respective positions of the two holes are different.

Advantageously and in a non-limiting way, the rod may further comprise a subset of intermediate section(s) between the first section and the tip, said subset comprising at least one intermediate section, the intermediate section with the largest diameter among said at least one intermediate section of said subset, called (N0+1), being capable of fitting within section N0, and the intermediate section with the smallest diameter among said at least one intermediate section of said subset being capable of receiving the tip.

In one embodiment, the overlapping of the holes in the second configuration is sufficiently small to prevent the line from moving in its linear direction (reeling in, for example). In this way the line can be locked with a simple rotational movement.

In one embodiment, each of the two holes extends to an end edge of the corresponding plugging element. Consequently, in one configuration the overlapping of the holes can be extended to the edges of these elements so that the plug can be removed from the sections (or installed), regardless of the presence of the line, using a simple lateral movement.

Alternatively, oblong holes not reaching the edges can be provided so that the relative rotation of one element with respect to the other causes a simple transition from a configuration allowing the line to move (in particular, when the user reels in the line) and a configuration in which the line is locked.

As a variant, holes extending to an end edge and passing through a midpoint could be provided so that a transition from a configuration allowing for removal of the plugging device to a configuration only allowing the line to pass in the event of reeling in is achieved simply by a relative rotation of one element with respect to the other.

A fishing rod is also provided comprising:
an assembly of at least two sections that can fit telescopically within each other, said assembly comprising at least a first line inlet section, called section N0, and a last section, called the tip.

Section N0 defines a radial line inlet passage, and the rod is arranged so that the line comes out through an opening in the tip at the smaller-diameter end of the tip, called the line outlet end.

The rod is arranged to be able to transition from a fully retracted position, in which all the sections of said assembly fit telescopically in each other, to a deployed position, in which all the sections of said assembly are deployed with respect to each other.

The rod further comprises:
at least a first anti-rotation component integral to one of either section N0 (or a section preceding section N0) or section (N0+j), j being equal to or greater than 1, extending radially and longitudinally,
at least a second anti-rotation component, integral to the other of either section N0 (or a section preceding section N0) or section (N0+j), and capable of abutting against the first anti-rotation component when the rod is in the fully retracted position.

Consequently, when the rod is retracted, the rotation of section N0+j with respect to section N0 (or a preceding section) is limited, thus preventing the line from becoming tangled.

Advantageously, two first anti-rotation components arranged on either side of the second anti-rotation component may be provided to limit the travel thereof.

The first and second anti-rotation components are sized and arranged so that the first anti-rotation components limit the tangential travel of the second anti-rotation component over a range of less than 20°, advantageously over a range of less than 10°.

A plurality of first and/or second anti-rotation components may be provided.

The anti-rotation components can comprise, for example, teeth meshing with each other, grooves, a stud-and-hole system, or other item.

Advantageously and in a non-limiting way, in addition to the first section, referred to as section N0, and the last section, referred to as the tip, the rod may further comprise a subset of intermediate section(s) between the first section and the tip, said subset comprising at least one intermediate section, the intermediate section with the largest diameter among said at least one intermediate section of said subset, called (N0+1), being capable of fitting within section N0, and the intermediate section with the smallest diameter among said at least one intermediate section of said subset being capable of receiving the tip.

Advantageously and in a non-limiting way, this rod is further arranged to adopt a semi-retracted position, called the line input position, in which section (N0+i), i being equal to or greater than 1, is deployed with respect to section N0 and in which the tip is received into section (N0+i).

Advantageously and in a non-limiting way, the fishing rod may further comprise:

for section N0 and/or at least one intermediate section, this section being frustoconical, a set of at least one movable line guide element in said section, each element of said set having an outside diameter within the range of inside diameters of said section and defining an opening for the line.

In a non-limiting embodiment, the first element (and/or the second element) extends longitudinally over at least 75% of the length of the section to which it (they) is (are) integral, advantageously over the entire length of the section. Rotation can thus be prevented when transitioning from the semi-retracted position to the fully retracted position.

In the case of two first elements on either side of the second element, rotation can thus be prevented by a sliding connection, for example a dovetail assembly.

When i is strictly greater than one, that is, there is one or more sections between section N0 and section N0+i, this first element (or the second element) can extend longitudinally not only over at least 75% of the length of section N0, but also over at least a portion of the section or sections between section N0 and section N0+i.

If the first element extends longitudinally over at least 75% of the length of the section of which it is an integral part, the second element may advantageously extend longitudinally over a much shorter length, for example less than 10% of the length of the section—and vice versa. This will facilitate manufacturing.

This shorter length may be less than 3 centimetres, advantageously about one centimetre.

The second element or, if applicable, the first elements, extending over a shorter length may be attached to or an integral part of an attached annular element (by threads or wedging) or an integral part of the larger-diameter inlet of section N0+j.

In this way, it can be easier to make this or these anti-rotation components, particularly in the case of an annular element made by machining or moulding.

When the first element extends longitudinally and is an integral part of a frustoconical section, the thickness (or depth) thereof in the radial direction can vary with the longitudinal position in order to accommodate the frustoconical nature of the section.

In the case of a rod comprising movable line guide elements, this annular element can comprise a fixed line guide element attached (such as by threads or wedging) or integral to the larger-diameter inlet of this section N0+i. This fixed line guide element may be arranged to cooperate with the larger-diameter movable line guide element received in this section N0+i or not.

One of either section N0 (or a section preceding section N0) and section (N0+j) can define a groove, for example, with two guide surfaces in planes extending radially and longitudinally, for example a right-angled or V-shaped groove.

The other section of either section N0 (or a section preceding section N0) or section (N0+j) can define a tenon, for example, to fit into the groove.

For example, section N0 (or a section preceding section N0) can define a groove longitudinally on the internal walls thereof, and the annular element attached to section N0+j can define a protrusion of a few centimetres long or less received into this groove.

According to another example, section N0 (or a section preceding section N0) can define on the internal walls thereof a tab extending longitudinally, for example the entire length of section N0 (or of a section preceding section N0).

For example, the annular element attached to section N0+1 can define a groove of a few centimetres long or less, sufficiently deep radially to receive a portion of the tab and coming out longitudinally on both sides, and form a sliding connection together with the tab.

In the case of a frustoconical section N0 (or preceding section), the thickness of the tab (in the radial direction) can be made to vary along this section N0 or preceding section so as to adapt to the frustoconical shape. In this way, the cooperation between the tab and the groove defined in the annular element is impacted little when section N0+j is moved in relation to this frustoconical section N0 or preceding section.

A fishing rod is also provided comprising:
an assembly of at least two sections that can fit telescopically within each other, said assembly comprising at least a first line inlet section, called section N0, and a last section, called the tip.

Section N0 defines a radial line inlet passage, and the rod is arranged so that the line comes out through an opening in the tip at the smaller-diameter end of the tip, called the line outlet end.

The rod is arranged to be able to transition from a fully retracted position, in which all the sections of said assembly fit telescopically in each other, to a deployed position, in which all the sections of said assembly are deployed with respect to each other.

The rod further comprises, a retention device for section N0+k, where k varies from 1 to 3, in section N0, said device being arranged in the fully retracted position to resist a force tending to bring section N0+k out of section of less than a threshold value, while allowing line movements in the longitudinal direction of the line.

This threshold value can be equal to or less than 10 N.

This retention device can comprise, for example, at least one rib extending longitudinally and radially, attached by an edge thereof to one of either section N0 (or a preceding section) or section N0+k, and shaped and arranged so that, when in the fully retracted position, one edge of this rib opposite this attachment edge and extending longitudinally is wedged against an element attached to the other (or directly to the other) of either section N0 (or a preceding section) or section N0+k.

This rib or these ribs can thus delimit passages for the line, whereas this wedging retains section N0+k in section N0 (or a preceding section).

In one embodiment, these ribs can extend radially between the outside walls of section (N0+k) and the inside walls of section N0 or (a preceding section).

For example, section N0 can be equipped with these ribs near the larger-diameter end thereof. These ribs are attached, such as by adhesive bonding, to the inside walls of section N0 (or a preceding section), and when section N0+k is received into section N0 (or a preceding section), the inside edge of these ribs rubs against the outside walls of section N0+k. The line can pass through passageways defined by sections N0 and N0+k and separated from each other by the ribs.

According to another example, the ribs can be attached to the outside walls of section (N0+k) such as by adhesive bonding or nesting. When this section (N0+k) is received into section N0 (or a preceding section), the outside edge of these ribs is wedged against section N0 (or a preceding section). In this example, when transitioning from the fully retracted position to the semi-retracted position, the wedging continues, but this may be advantageous in that, in this way, the position of section N0+k can be adjusted in relation to section N0. This may make it possible to avoid having one or more sections preceding section N0, since this possibility of length adjustment is thus offered when deploying section N0+k.

In one embodiment, these ribs can extend radially between the inside walls of section (N0+k) and the outside walls of an element attached to section N0 or (a preceding section) received into section (N0+k).

For example, the ribs can be attached to section N0+k and extend from the inside walls of section (N0+k) to the inside of the rod. Wedging against a central stud attached to section N0 (or to a preceding section) can thus be provided.

In an advantageous embodiment, the component against which the at least one rib is wedged can comprise a central stud attached or integral to an end element attached to section N0 and closing the rod.

The rib or ribs can be attached to an annular element attached (such as by threads or wedging) or integral to the larger-diameter inlet of section N0+k.

In the fully retracted position, this stud can be received into this annular element. The passageways are then defined by the stud, the inside walls of the annular element, and the ribs.

According to another example, the ribs can be attached to the stud and be wedged against the inside walls of section (N0+k).

Advantageously and in a non-limiting way, the fishing rod may further comprise:

for at least one frustoconical intermediate section, a set of at least one movable line guide element in said intermediate section, each element of said set having an outside diameter within the range of inside diameters of said intermediate section and defining a line opening.

In the case of a rod comprising movable line guide elements, this annular element can comprise a fixed line guide element attached (such as by threads or wedging) or integral to the larger-diameter inlet of section (N0+k), said fixed line guide element can be arranged to cooperate with the larger-diameter movable line guide element received into this section (N0+k).

A fishing rod is provided comprising:

an assembly of at least two sections that can fit telescopically within each other, said assembly comprising at least a first line inlet section, called section N0, and a last section, called the tip.

for at least one section of said assembly, this at least one section being frustoconical, a set of at least three line guide elements, two of which at least are movable in said frustoconical section, each line guide element corresponding to a respective outside diameter within the range of inside diameters of this frustoconical section, the set of at least three guide elements being ordered by increasing outside diameter when inserted by the larger-diameter end of said frustoconical section, and each line guide element comprising a body defining a passageway for the line, and comprising A first rigid body part, the outside diameter of which is that of said guide element, A second body part that is more flexible than the first body part.

Each movable line guide element further comprising

A third body part.

The second body part is between the first body part and the third body part.

The set is shaped so that for each guide element, with the exception of the larger-diameter guide element:

the first part of this guide element can receive the second part of a larger-diameter adjacent guide element, the outside walls of this second part and the inside walls of this first part being arranged to cooperate with each other, the second part of this guide element can receive without play the second part of the larger-diameter adjacent guide element.

Thus, when the guide elements of the set nest within each other, the second parts of all the guide elements of the set, with the exception of the first (of larger diameter) and the last (of smaller diameter), are held:

on the one hand, by the first part of the smaller-diameter adjacent guide element via the cooperation means, on the other hand, by the third part of the larger-diameter adjacent guide element, without play.

Advantageously, the last guide element can be attached to a section received into this frustoconical section by a stronger connection than this nesting between adjacent line guide elements, for example a connection resisting forces greater than 50 N (with threads or adhesive bonding, for example).

It turns out that this arrangement, when a guide element is wedged along its periphery against the frustoconical section in which it is received, makes it possible to disconnect this element from the other mutually nested elements, and not another element.

Without wishing to be bound by a theory, it is possible that the connection between a flexible second part of an element and the first rigid part of the adjacent element is strengthened by the play-free connection of this second part to the third part of the other adjacent element when this other element is present; and that, with regard to the larger-diameter element of the set of nested elements, the absence of reinforcement of the connection between its second part and the first part of the adjacent element (missing third part of the adjacent element) makes this connection more fragile than the others, with the result that it is this larger-diameter element that detaches from the others.

At the smaller-diameter end of the set of guide elements, an element with a first and a second part cooperating with the second and third part of the smallest movable element can be provided, for example, this end element furthermore being attached or integral to an adjacent section.

BRIEF DESCRIPTION OF THE DRAWINGS

The invention will now be described in reference to the appended non-limiting drawings, in which.

DESCRIPTION OF THE PREFERRED EMBODIMENTS

Identical references will be used from one figure to the next to refer to identical or similar parts.

Figure 1A:
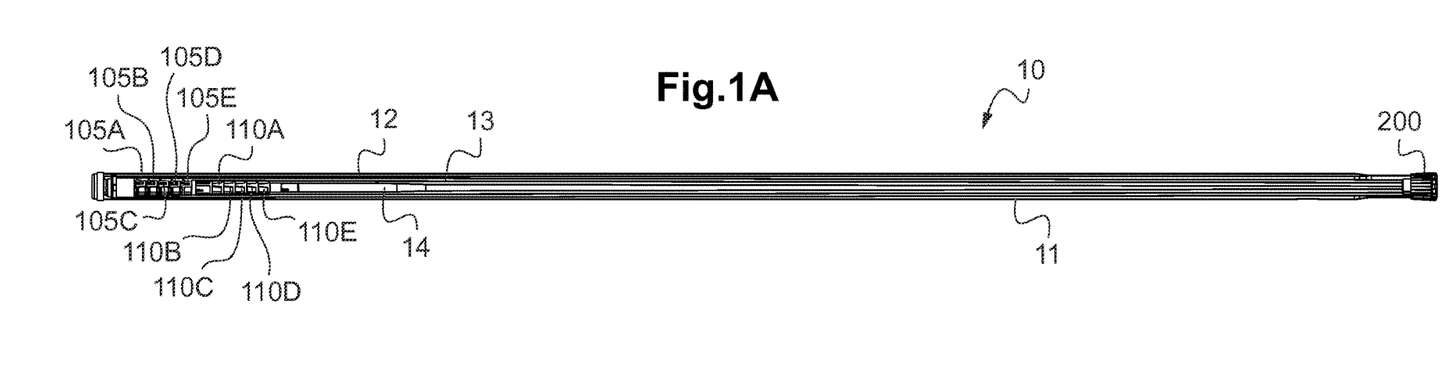
FIG. 1A shows an example of a rod according to one embodiment of the invention, in the fully retracted position.

In reference to FIG. 1A, a rod 10 comprises an assembly of a plurality of sections, here four sections 11, 12, 13, and 14 that fit together telescopically.

Section 11, called the first section or line inlet section, with a larger diameter, is capable of receiving section 12.

Section 14, with a smaller diameter, called the tip, is received into section 13.

Sections 12 and 13, called intermediate sections, are frustoconical, that is, their cross-sectional diameter varies continuously from a larger-diameter inlet to a smaller-diameter outlet.

Sections 11 and 14 may or may not be frustoconical.

Tip 14 defines internal line guide elements, not shown. These elements are fixed.

Intermediate sections 12 and 13 receive movable line guide elements 105A-105E, 110A-110E, with outside diameters that decrease from one element to the next, and which are wedged one after the other against the inside walls of sections 12 and 13 when the rod is deployed.

The fully deployed position is not shown in these figures, but it is easy to understand that all the sections are deployed in relation to each other, guide elements 105A-105E and 110A-110E being distributed along sections 12 and 13.

Figure 1B:
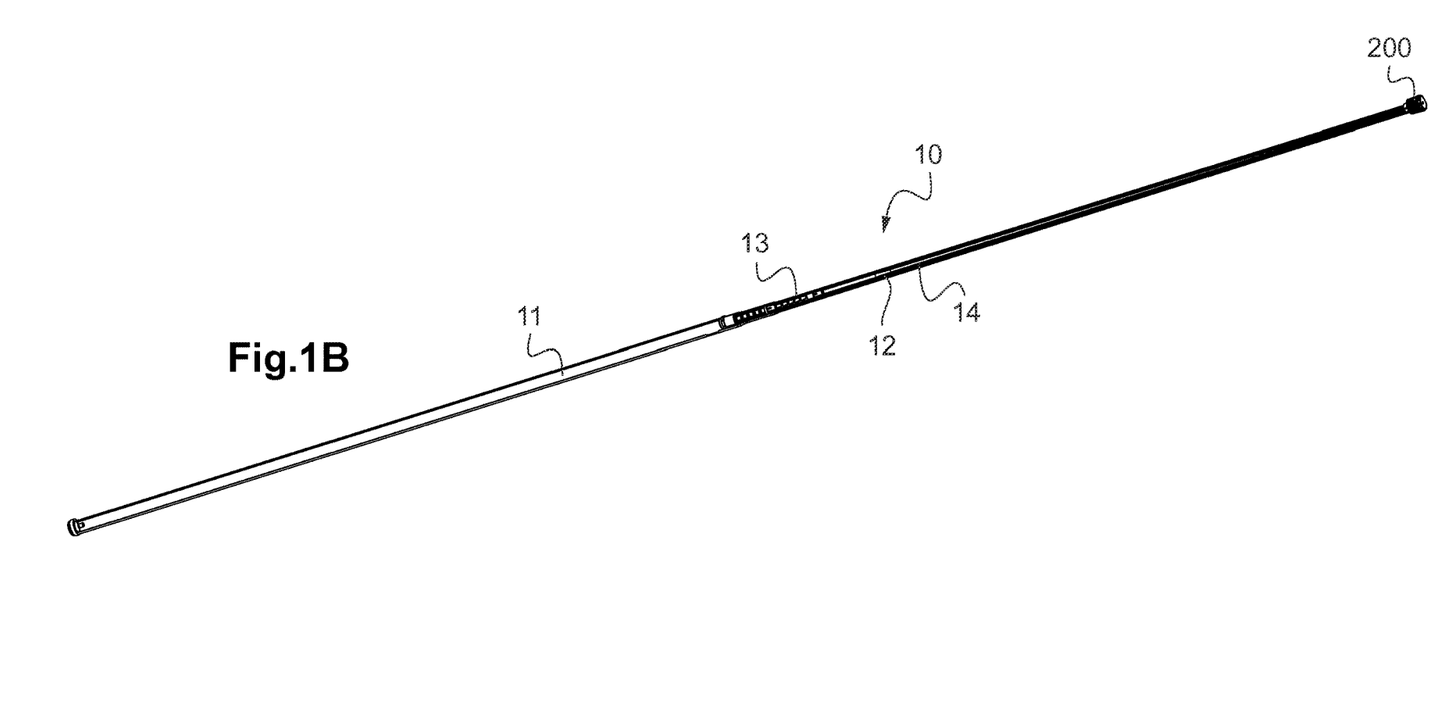
FIG. 1B shows an example of a rod according to this embodiment of the invention, in the semi-retracted position.

A plugging device 200 keeps sections 11-14 together in the retracted position, as shown in FIG. 1A, and sections 12-14 in the semi-retracted position, as shown in FIG. 1B.

Figure 3:
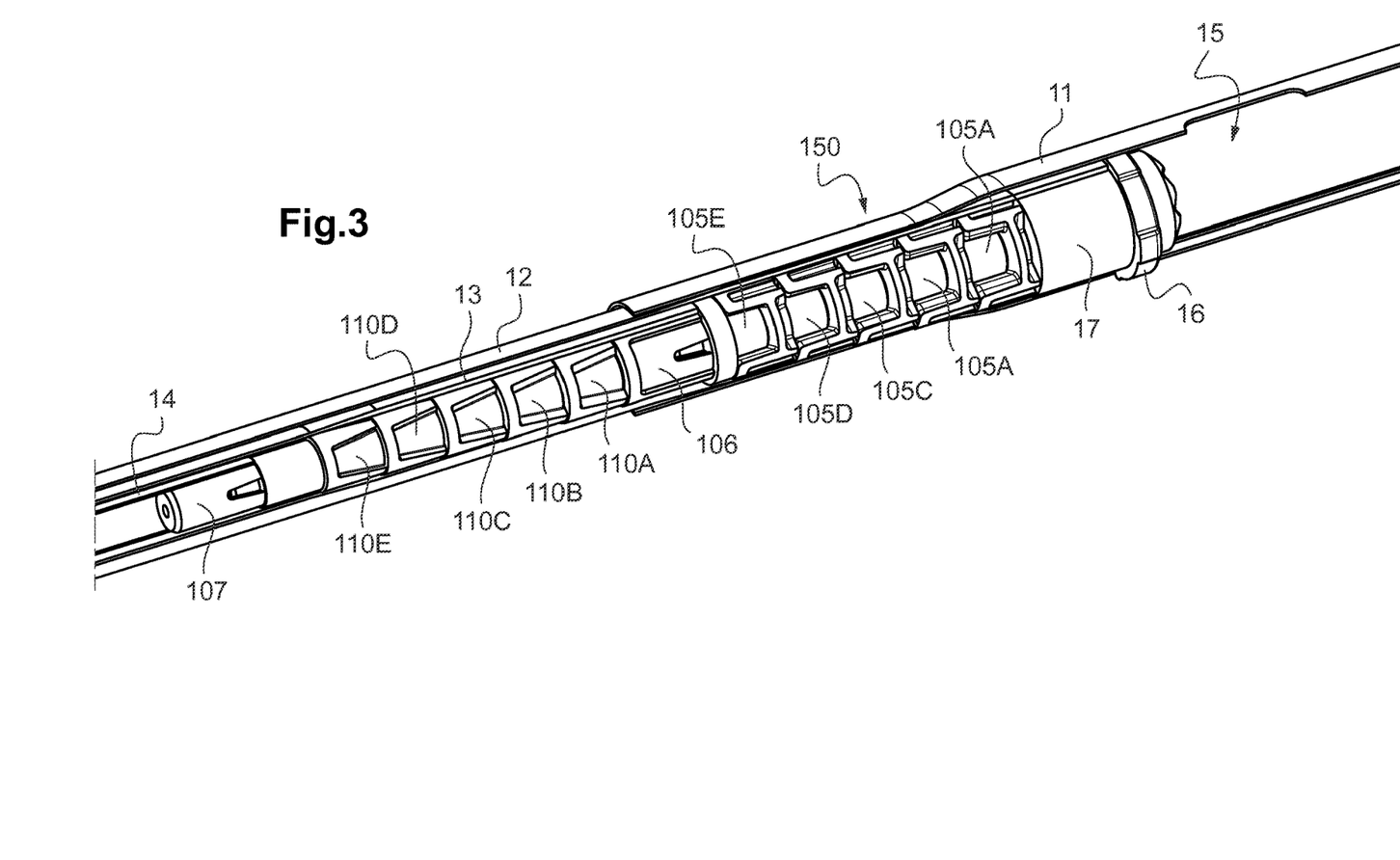
FIG. 3 is a view of a portion of this rod in the semi-retracted position.

In the semi-retracted position, as shown in FIG. 1B and in FIG. 3, first retention means 107, 110A-E, 106, 105A-E, and 16 hold tip 14 so as to prevent it from reaching a line input passage 15 defined in first section 11, even if the tip is pushed toward this inlet 15 with a reasonable force of 10 N or less.

This inlet 15 is defined within the walls of section 11, that is, the line is inserted laterally and not at the end of section 11. This can be more comfortable for the user because a spool (not shown) can be installed on the walls of this section 11 or on a preceding section, not shown, serving as a handle.

In the semi-deployed state, an interference-fit portion 150 of section 11, having a narrower cross-section than the rest of section 11, the inside walls of which rub slightly against the outside walls of section 12, enough to resist a force of less than 10 N tending to retract the assembly of sections 12-14 fitting telescopically into section 11, prevents sections 12-14 fitting telescopically within each other from entering further into section 11, which would hinder insertion of the line into inlet 15.

The first retention means prevent sections 13 and 14 from passing through section 12 and blocking inlet 15.

The first retention means comprise components 107, 110A-E, 106, 105A-E, and 16 which nest within each other and which thus attach section 14 to section 12.

Consequently, when the rod in the semi-retracted state is placed vertically with the plugging device facing upward, gravity does not cause the assembly of sections 12-14 to collapse into section 11, nor does it cause sections 13-14 to fall into section 11.

In addition, second retention means 200, 17, 105A-105E, 106, 110A-110E, and 107 keep tip 14 and section 13 from coming out of section 12 through the smaller-diameter end when the rod is turned over by 180°, that is, vertical in this case (per the direction of the gravity vector) with the plug facing downward.

These second retention means comprise:
plugging device 200, which is arranged to keep sections 12-14 together.
the assembly of elements 17, 105A-105E, 106, 110A-110E, and 107, these elements cooperating with each other in the semi-retracted state, and end elements 17, 106, and 107 being attached (or integral to) section 12, section 13, and tip 14, respectively. The assembly of these elements 17, 105A-105-D, 106, 110A-110F, and 107 thus keep tip 14 in section 12.

Figure 2A:
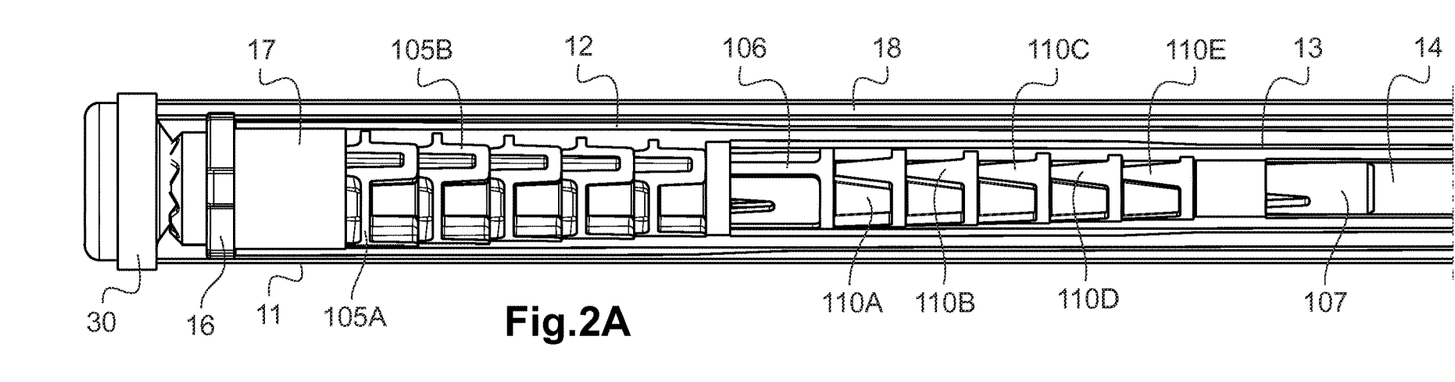
FIG. 2A is a view of a larger-diameter end part of this example of a rod when in the retracted position.
Figure 2B:
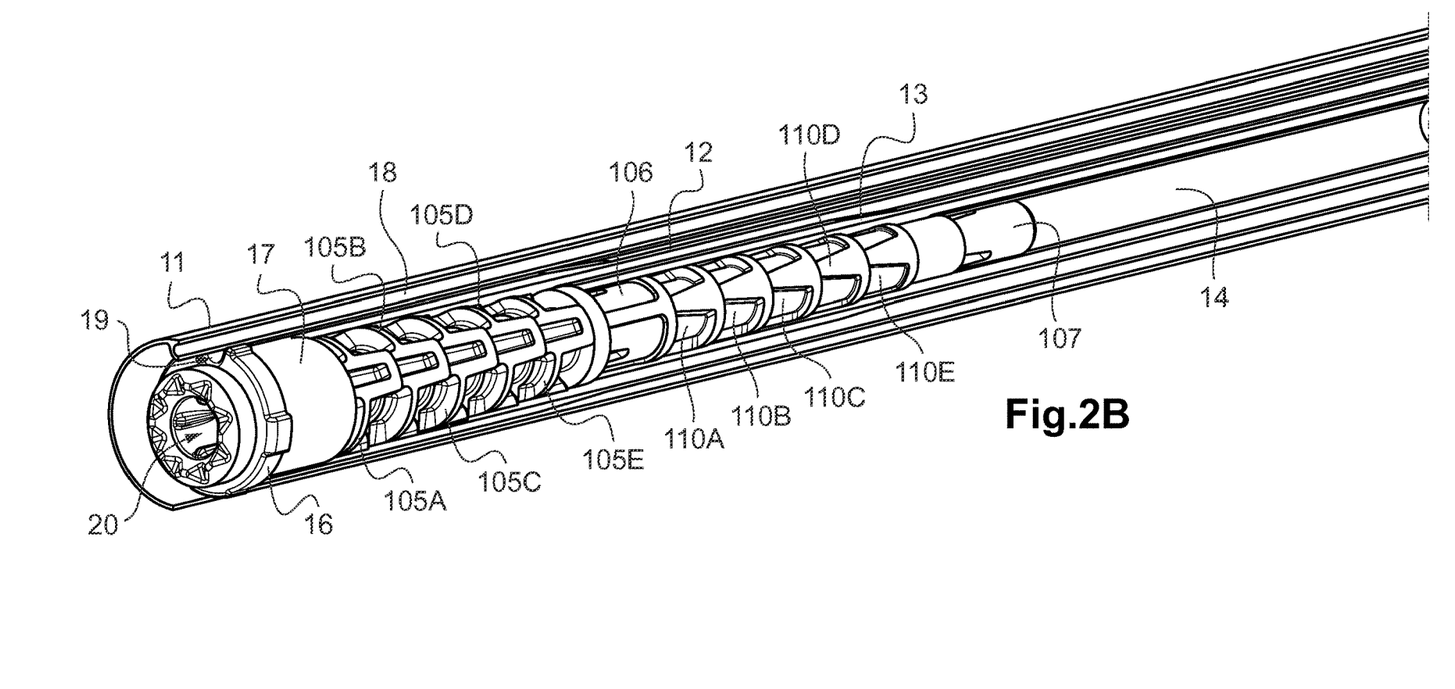
FIG. 2B is a view of a portion of the larger-diameter end part of this example of a rod when in the retracted position.

Furthermore, in references to FIGS. 2A and 2B concerning the fully retracted state, section 11 comprises a tab 18 extending over the entire length thereof and attached or integral to the tube of section 11. This tab extends radially by a few millimetres and cooperates with a groove defined in annular element 16.

This groove 19 can be sufficiently deep (radially) to be able to receive a portion of the tab. Groove 19 is open longitudinally on both sides so that it can slide on tab 18.

Annular element 16 is sized so that section 12 can be inserted into section 11 only if groove 19 receives a portion of tab 18. For a different angular distance, section 12 cannot be inserted into section 11.

If, after proper positioning, section 12 is moved in relation to section 11, this groove 19/tab 18 cooperation continues, thus preventing any rotation of section 12 with respect to section 11, which is particularly useful when a line has been inserted via inlet 15 and an end opening of section 12. Indeed, a rotational movement could tangle the line.

The tab 18/groove 19 system acts as a guide when transitioning from the retracted position to the semi-retracted or deployed position, and vice versa, thus preventing relation rotations of section 12 in relation to section 11.

In addition, in the retracted state, this tab 18/groove 19 system further prevents relative rotations of section 12 in relation to section 11.

Figure 4:
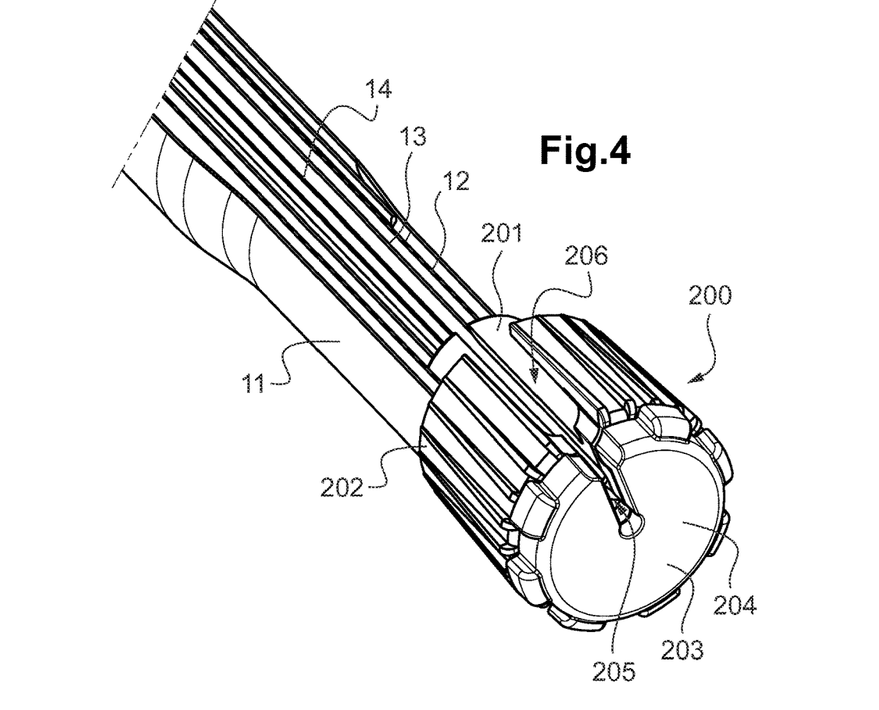
FIG. 4 is a view of a smaller-diameter end part of this example of a rod when in the retracted position.
Figure 5:
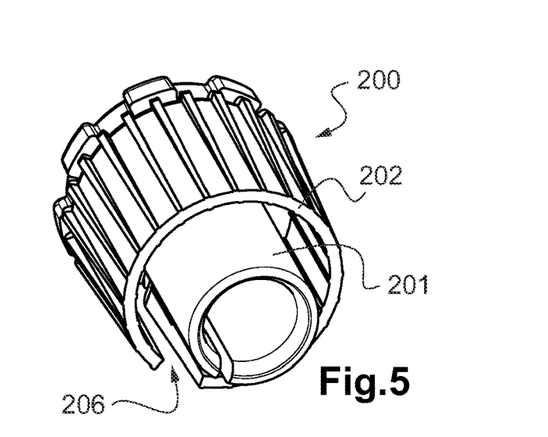
FIG. 5 is a perspective view of an example of a plugging device of this example of a rod.
Figure 6:
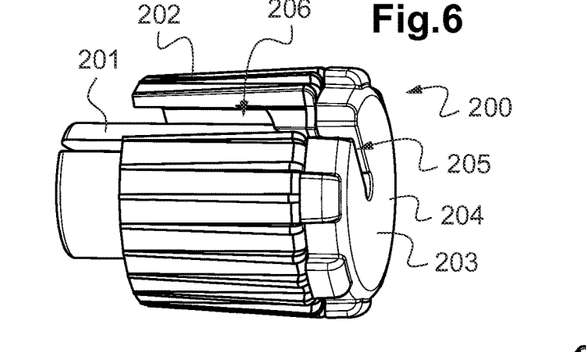
FIG. 6 is a perspective view of an example of a plugging device of this example of a rod.

In reference to FIGS. 4, 5, and 6, plugging device 200 comprises first attachment means 201, attaching sections 12-14 together, and second attachment means 202, attaching sections 11-14 together.

More specifically, plugging device 200 comprises a circular-shaped bottom 203 with a large enough diameter to cover the end of section 11.

The first attachment means comprise a first flexible peripheral wall 201 protruding from bottom 203, having a roughly cylindrical shape with a circular cross-section and an inside or outside diameter equal to (or close to) the outside or inside diameter of the end of section 12.

The second attachment means comprise a second, advantageously flexible peripheral wall 202 protruding from bottom 203, having a roughly cylindrical shape with a circular cross-section and an inside diameter equal to (or close to) the outside diameter of the end of section 11.

These two walls 201 and 202 are concentric.

Wall 201 extends beyond wall 202 so that, when transitioning from the retracted position to the semi-retracted position, section 11 easily detaches from plugging device 200, leaving other sections 12-14 held by wall 201.

In this embodiment, bottom 203 is a double bottom, that is, it comprises a first bottom 204 and a second bottom on top of this bottom 204 and not shown in the figures, and from which walls 201 and 202 emanate.

More specifically, the plugging device comprises a first plugging element comprising bottom 203 and a second plugging element comprising the non-illustrated bottom and walls 201 and 202.

Each plugging element can be a single part.

Each plugging element defines a respective through-hole 205, 206 for inserting the line.

The plugging elements are movably mounted so as to rotate with respect to each other so that, for a certain angular distance, the two holes 205 and 206 overlap, allowing the line to be reeled in.

When the first plugging element is rotated until it reaches another angular distance value, the overlapping area of the holes can become zero, that is, the line is then locked.

Note that these holes 205 and 206 extend to end edges of the plugging device. When these holes align, the overlapping area reaches these edges, allowing the plugging device to be removed/installed in a relatively easy way, despite the presence of the line, by a simple lateral movement.

Figure 7:
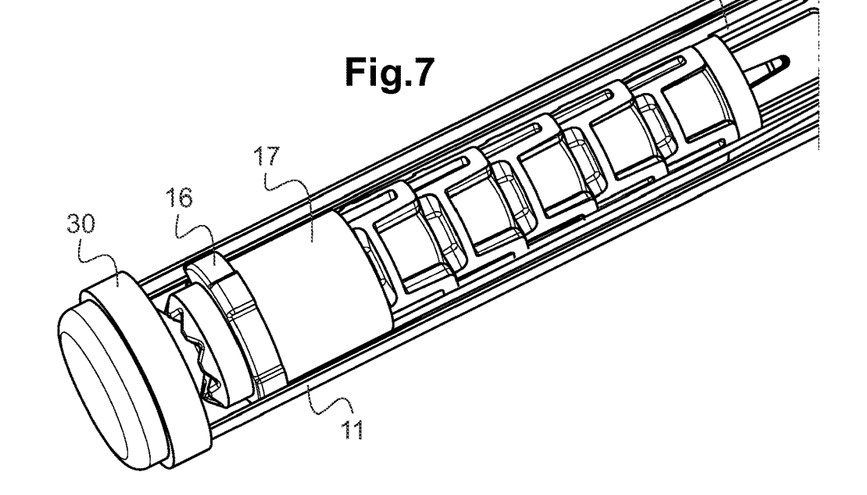
FIG. 7 is a view of a larger-diameter end part of this example of a rod when in the retracted position.
Figure 8:
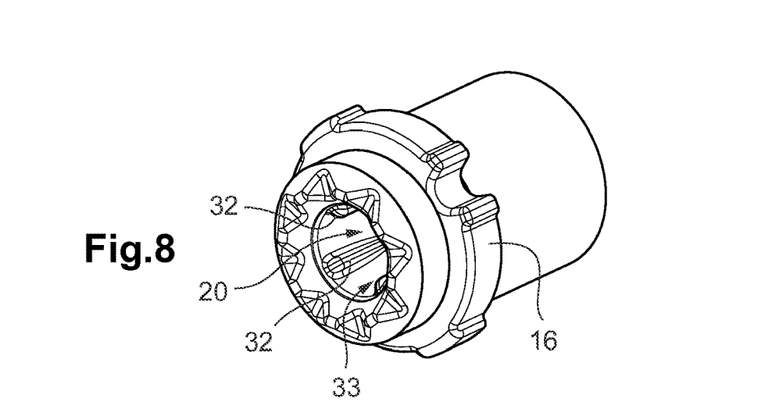
FIG. 8 is a perspective view of an end element of section N0+1 for this example of a rod.
Figure 9:
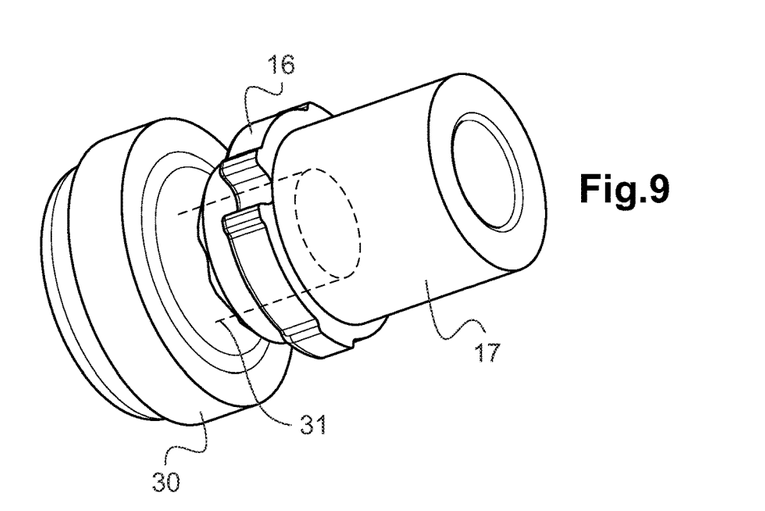
FIG. 9 is a perspective view of end elements for this example of a rod.

In references to FIGS. 7, 8, and 9, it can be noted that this example of a rod further comprises a retention device 16, 30 for retaining section 12 in section 11, capable of opposing the forces induced by the line when it is reeled in while the rod is in the fully collapsed state. Indeed, the line then exerts forces tending to bring section 12 out of section 11.

An end element 30 attached to section 11, for example wedged or screwed on to the end of the rod, comprises for this purpose a stud 31 extending longitudinally toward the tip.

Annular element 16 attached to section 12, for example wedged or screwed on to the end of section 12, defining opening 20 for the line to pass, defines internal ribs 32 extending radially.

When stud 31 enters this opening, these ribs 32 are wedged against the outside walls of stud 31, which may be enough to oppose any forces exerted by the line.

Ribs 32 defining channels 33 between ribs 32, stud 31 and the cylindrical walls of annular element 16, through which the line can pass and flow freely.

Figure 10:
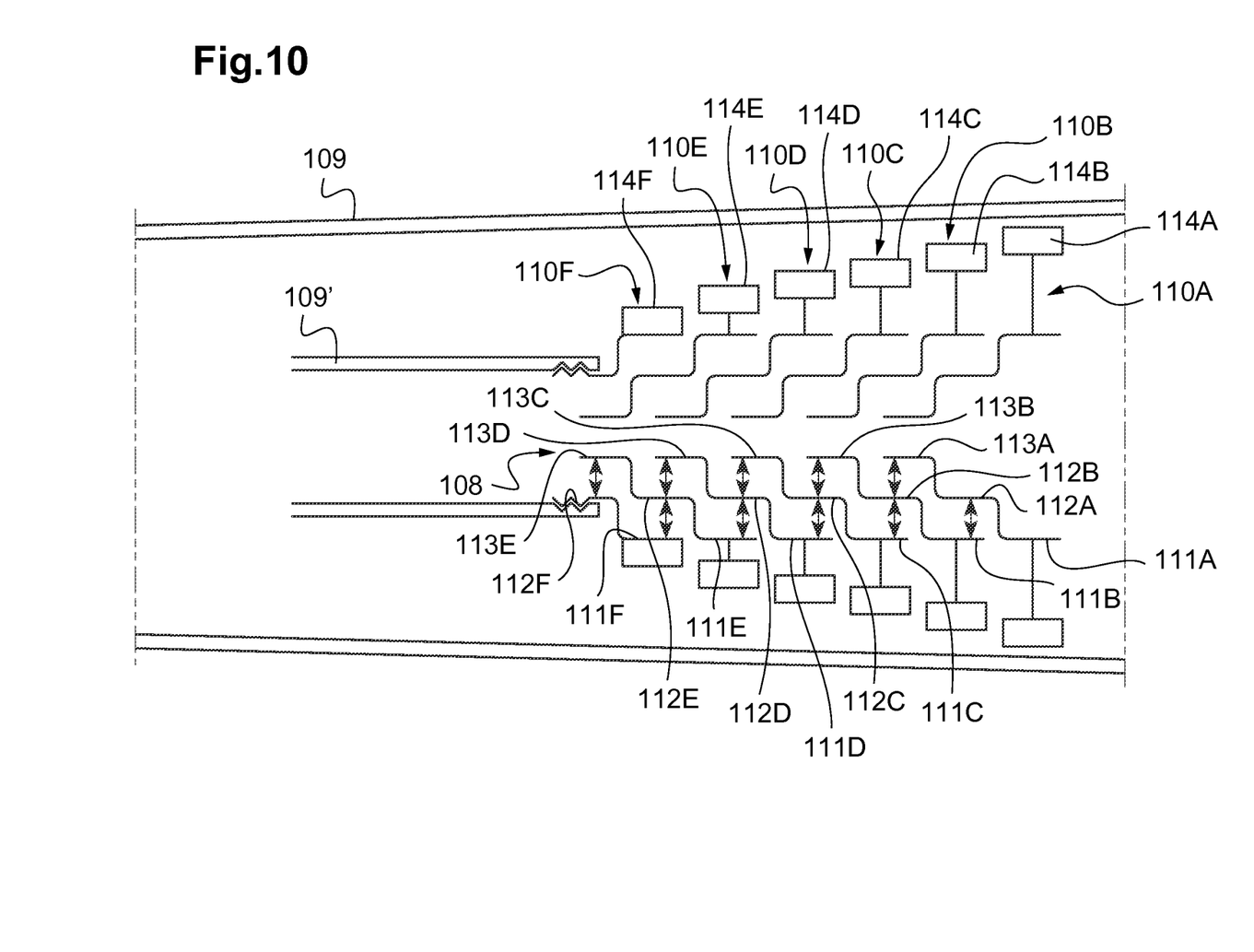
FIG. 10 is a very schematic illustration of a set of line guide elements received into a frustoconical section of a rod according to one embodiment of the invention.

FIG. 10 shows a schematic drawing of a set of line guide elements received into a frustoconical section of a rod according to an embodiment of the invention.

In this highly schematic figure, the frustoconical shape has been exaggerated and the connections between parts of elements are shown with double arrows.

A set of line guide elements 110A-110F fitting into each other is received into a frustoconical section 109.

Each line guide element 110A-110F defines an opening for the line, not shown, to pass. When these line guide elements are in each other, these openings line up with each other and form a tunnel for the line.

Each line guide element 110A-110F comprises a body comprising:
  a first rigid part 111A, 111B, 111C, 111D, 111E, and 111F intended to wedge against the inside walls of tube 109,
  a second more flexible part 112A-112F intended to be received in first part 111B-111F of the next element in the case of movable elements 110A-110E, and intended to be attached, such as by threads, to next smaller-diameter section 109' in the case of fixed line guide element 110F.

Movable line guide elements 110A-110E further comprise a third part 113A-113E intended to be received into second part 112B-112F of the next element.

The elements are shaped so that these insertions create forces tending to hold together the elements nesting within each other.

More specifically, each third part 113A-113E is received without play into second part 112B-112F of the next element.

"Without play" means exact dimensions or a slight negative play, so that the elements have to be forced to embed a third part in the second part of the next element.

And each second part 112A-112E cooperates with first part 111B-111F of the next element, for example by clips, wedging, or other means.

These connections are shown by double arrows in the figure.

Due to the flexibility of the second part, the presence of a third part reinforces the connection to the corresponding first part.

A wedging portion 114A-114F is attached to or an integral part of a first corresponding part 111A-111F.

This wedging portion 114A-114F defines the outside diameter of corresponding line guide element 110A-110F. For example, this may be a skate, skirt, or the first part itself (particularly for the smaller-diameter elements such as element 110F in FIG. 10).

In an advantageous embodiment, the first, second, and/or third parts have the same dimensions from one element to the next, these elements differing in their wedging portions.

Figure 11:
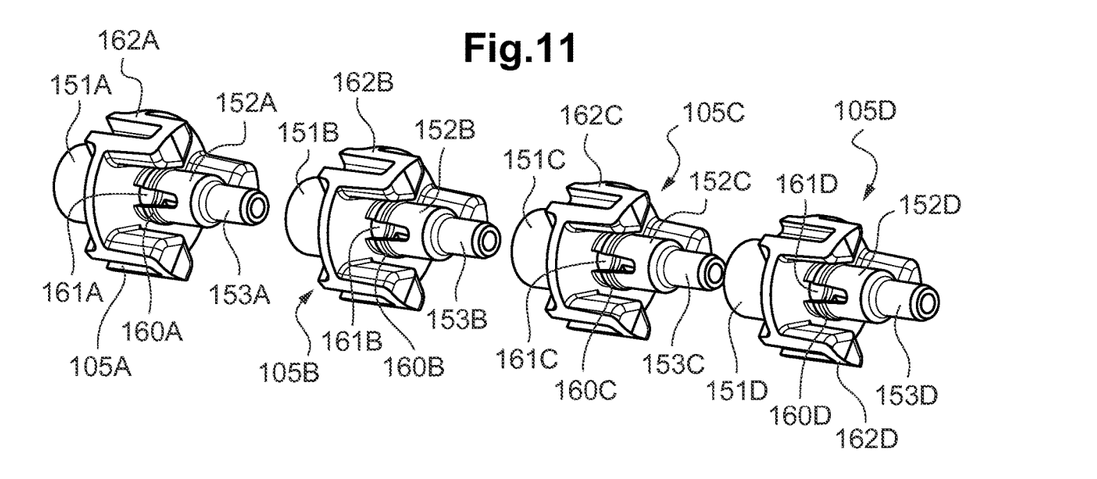
FIG. 11 is an exploded view of an example of a set of four guide elements, according to one embodiment of the invention.
Figure 12:
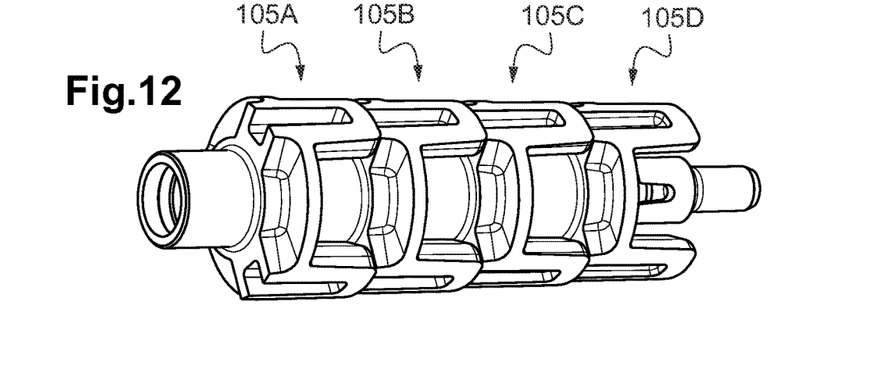
FIG. 12 is a perspective view of this example of a set of nested guide elements.
Figure 13:
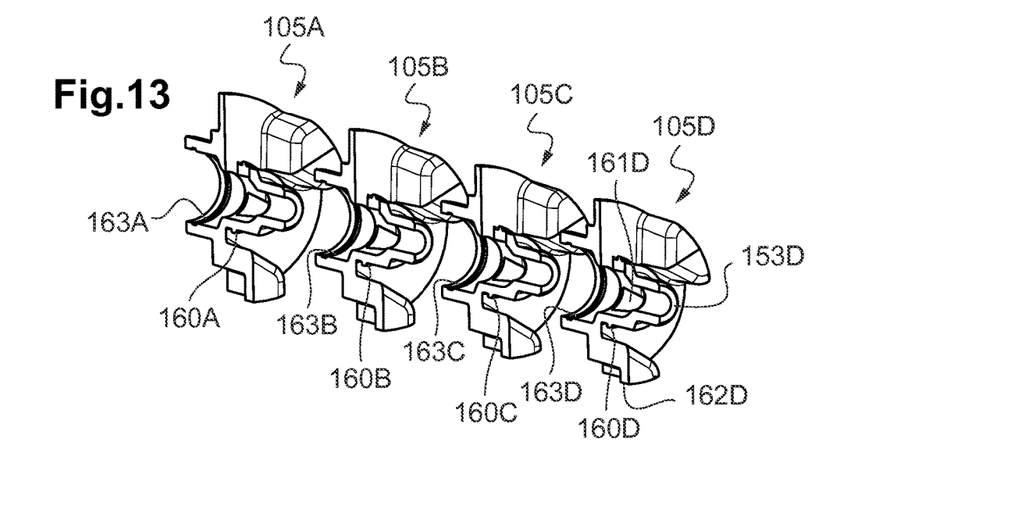
FIG. 13 shows ordered guide elements, only half of which are shown, according to one embodiment of the invention.

FIGS. 11 to 13 show examples of less schematic guide elements 105A-105D.

Each guide element 105A-105D comprises a first part 151A-151D, a more flexible second part 152A-152D defining clipping means such as 160A-160D, and a third part 153A-153D.

In this example, the flexibility of second part 152A-152D is obtained by means of open work on this second part. Openings 161A-161D defined in second part 152A-152D make the walls thereof more flexible.

In this example, the clipping means comprise ridges 160A-160D intended to cooperate with grooves defined on the inside walls of the first part. Here, grooves 163B-163D receive corresponding ridges 160A-160C; grooves 163A and ridges 160D cooperating with two corresponding fixed line guide elements, not shown.

Wedging portions 162A-162D are an integral part of the body.

The invention claimed is:

1. A fishing rod comprising:
    an assembly of at least three sections configured to fit telescopically within each other, said assembly comprising
        a first section N0 of the at least three sections,
        a last section of the at least three sections, the last section being a tip, and
        a subset of at least one intermediate section N0+i of the at least three sections between the first section N0 and the tip, where i is equal to or greater than 1, one intermediate section N0+1 of at least one intermediate section with the largest diameter among said at least one intermediate section of said subset being configured to fit within the section N0, and one intermediate section of the at least one intermediate section with the smallest diameter among said at least one intermediate section of said subset being configured to receive the tip, the first section defining a line input passage on a periphery thereof extending in a direction having a radial component for lateral insertion of the line, the rod being configured to move from a fully retracted position, in which all the sections of said assembly fit telescopically within each other, to a deployed position, in which all the sections of said assembly are deployed with respect to each other, the rod being configured to adopt a semi-retracted position that is a line input position, in which the section N0+i is deployed with respect to the section N0 and in which the tip is received into the section N0+i;
    a first retention system configured to abut, in the semi-retracted position when the tip is pushed toward section N0, against the tip to retain the tip with respect to section N0+i and prevent the tip from reaching the line input position;
    a second retention system configured to hold the tip in the semi-retracted position when subjected to forces of less than 10 N tending to move the tip away from section N0, in a location corresponding to an abutment against the first retention system or less than 30 centimeters, from a position of abutment against the first retention system,
    wherein the at least one intermediate section is frustoconical, at least three guide elements being received in said at least one intermediate frustoconical section, of which at least two of the guide elements are movable in said at least one frustoconical section, said at least three guide elements being ordered by increasing outside diameter when inserted through a larger-diameter end of said at least one frustoconical section, each the at least three guide elements comprising a body defining the passageway for the line, the body comprising
        a first rigid body part having an outside diameter of which is the outside diameter of said respective guide element, and
        a second body part that is more flexible than the first body part,
        each of the movable guide elements further comprising a third body part, the second corresponding body part being between the first corresponding body part and the third body part,
    wherein the guide elements are shaped so that, for each respective guide element, with the exception of a larger-diameter guide element of the guide elements:
        the first part of the respective guide element is configured to receive the second part of a larger-diameter adjacent guide element, the outside walls of the second part of the larger-diameter adjacent guide element and the inside walls of the first part of the respective guide element being configured to cooperate with each other,
        the second part of respective guide element is configured to receive, without play, the second part of the larger-diameter adjacent guide element.

2. The rod according to claim 1, wherein the second retention system comprises at least one set of the at least two movable line guide elements, the rod being configured so that, in the semi-retracted position, for one of the at least one intermediate sections:
    said at least one set comprises at least two of the movable guide elements received into said one intermediate section, all the movable line guide elements received into said one intermediate section are removably attached to each other,
    the smaller-diameter movable line guide element is attached to the next section, and
    the larger-diameter movable line guide element is removably attached to said one intermediate section.

3. The rod according to claim 2, wherein the second retention system comprises a plugging device configured for a free end of the tip and to keep the tip and the sections up to the section N0+i together, independently of the first section.

4. The rod according to claim 3, further comprising:
    at least one first anti-rotation component integral to one of the section N0 and the section N0+i, i being equal to or greater than 1, extending radially and longitudinally,
    at least one second anti-rotation component, integral to the other of the section N0 and the section N0+i, and configured to abut against the first anti-rotation component when the rod is in the fully retracted position.

5. The rod according to claim 1, wherein the second retention system comprises a plugging device configured for a free end of the tip and to keep the tip and the sections up to section N0+i together, independently of the first section.

6. The rod according to claim 5, wherein the plugging device is further configured to hold the tip, the subset of the at least one intermediate section, and the first section together when the fishing rod is in the retracted position.

7. The rod according to claim 6, wherein the plugging device comprises two movable plugging elements configured to move rotationally in relation to each other about the longitudinal axis of the rod when the plugging device is installed at the line outlet end, each plugging element defining a through-hole for the line to pass through, and the plugging device is configured so that the two movable plugging elements are configured to be arranged according to a first configuration, in which said holes overlap at least partially so that the line can be wound up or paid out, and according to a second configuration in which the respective positions of the two through-holes are different.

8. The rod according to claim 6, further comprising:

at least one first anti-rotation component integral to one of the section N0 and the section N0+i, i being equal to or greater than 1, extending radially and longitudinally, at least one second anti-rotation component, integral to the other of the section N0 and the section N0+i, and configured to abut against the first anti-rotation component when the rod is in the fully retracted position.

9. The rod according to claim 5, wherein the plugging device comprises two movable plugging elements configured to move rotationally in relation to each other about the longitudinal axis of the rod when the plugging device is installed at the line outlet end, each plugging element defining a through-hole for the line to pass through, and the plugging device is configured so that the two movable plugging elements are configured to be arranged according to a first configuration, in which said holes overlap at least partially so that the line can be wound up or paid out, and according to a second configuration in which the respective positions of the two through-holes are different.

10. The rod according to claim 5, further comprising:

at least one first anti-rotation component integral to one of the section N0 and the section N0+i, i being equal to or greater than 1, extending radially and longitudinally, at least one second anti-rotation component, integral to the other of the section N0 and the section N0+i, and configured to abut against the first anti-rotation component when the rod is in the fully retracted position.

11. The rod according to claim 1, further comprising:

at least one first anti-rotation component integral to one of the section N0 and the section N0+i, i being equal to or greater than 1, extending radially and longitudinally, at least one second anti-rotation component, integral to the other of the section N0 and the section N0+i, and configured to abut against the first anti-rotation component when the rod is in the fully retracted position.

12. The rod according to claim 11, wherein the first anti-rotation component is a tab running along the inside wall of and the entire length of section N0, and wherein the second anti-rotation component is a groove leading to the outside on both sides, defined in an annular element at the larger-diameter end of the section N0+i and sufficiently deep radially to be able to receive a portion of the tab.

13. The rod according to claim 1, further comprising at least one rib extending longitudinally and radially, attached by one of edge thereof to one of the section N0 and a section N0+k, k varying between 1 and 3, and shaped and placed so that, when in the fully retracted position, an edge of the rib opposite the attachment edge and extending longitudinally becomes wedged against an element attached to the other, or directly against the other, of the section N0 or section N0+k, to resist a force tending to pull the section N0+k out of the section N0 of less than a threshold value, while allowing the line to move in the longitudinal direction thereof.

* * * * *